Feb. 11, 1941.   C. C. BEACHAM   2,231,048
PROCESS OR METHOD OF GEOPHYSICAL PROSPECTING
Filed Nov. 22, 1935   3 Sheets-Sheet 1

INVENTOR
Clarence C. Beacham

Feb. 11, 1941.  C. C. BEACHAM  2,231,048
PROCESS OR METHOD OF GEOPHYSICAL PROSPECTING
Filed Nov. 22, 1935    3 Sheets-Sheet 3

INVENTOR
Clarence C. Beacham

Patented Feb. 11, 1941

2,231,048

UNITED STATES PATENT OFFICE 2,231,048

PROCESS OR METHOD OF GEOPHYSICAL PROSPECTING

Clarence C. Beacham, Somerset, Ohio

Application November 22, 1935, Serial No. 51,068

9 Claims. (Cl. 175—182)

The object of this invention is to provide an improved method of determining the location and character of subsurface bodies or earth portions having electrical resistivities differing from that of adjacent earth.

Earth resistivities may be determined by means of the well known method which basically consists of causing electric current flow through the earth between two spaced apart electrodes and the measurement of potential difference due to this current flow between two other spaced apart electrodes. Theoretically the depth to and nature of subsurface electrical resistive changes occurring underneath the current electrodes may be determined because of the relations existing between the apparent resistivity for a given separation of current and potential electrodes and the occurrence of such subsurface resistivity changes. In practice this is rarely possible with a sufficient degree of precision because of resistivity variations near the surface and in the vicinity of the electrodes which are moved to secure a variation of electrode spacing. The purpose of my invention is to provide a method for obtaining data from which subsurface resistivity changes may be determined which has a high degree of independence of resistivity changes in the vicinity of the electrodes which are moved.

Figure 1:
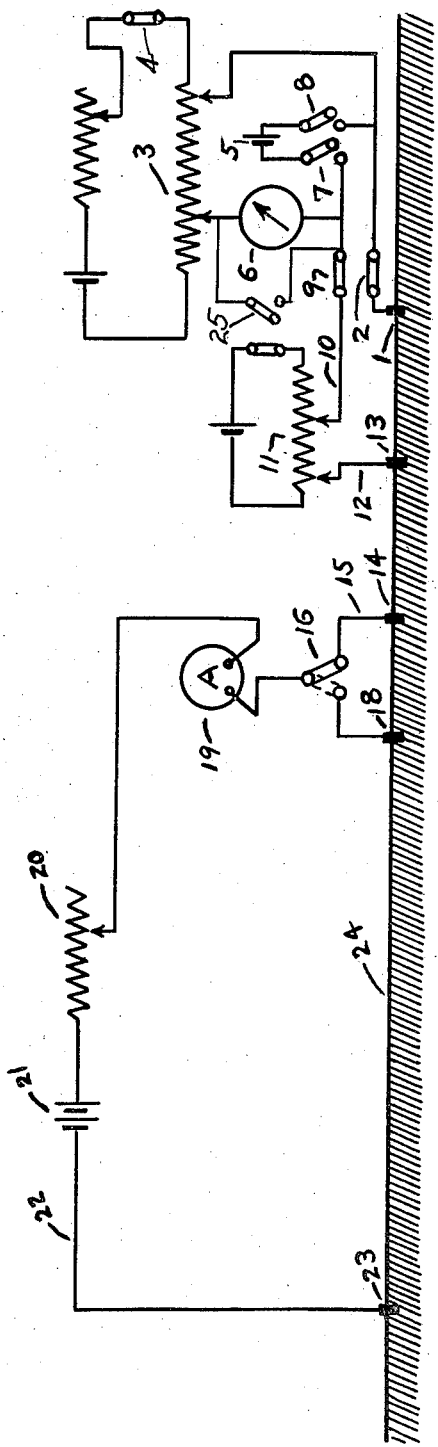

My invention and its application to the measurement of earth resistivities is illustrated by the accompanying drawings Figure 1:

Reference numerals 14, 18, and, 23 are any type of electrode suitable for making a sufficiently low resistance contact with the earth, 24, and at the same time have dimensions which are small in proportion to the electrode separation employed. 13 and 1 are any type of electrode suitable for potential difference measurement between two points in the earth but are preferably of the well known non-polarizable type. The word point is used herein to signify small dimensions in proportion to the electrode separation employed. Electrodes 23, 18, 14, 13, and 1 are preferably placed approximately along the same straight line, although other electrode arrangements such as placing 23 on the perpendicular bisector of the line joining 18 and 14 or at other points, may be employed.

Figures 2, 3:
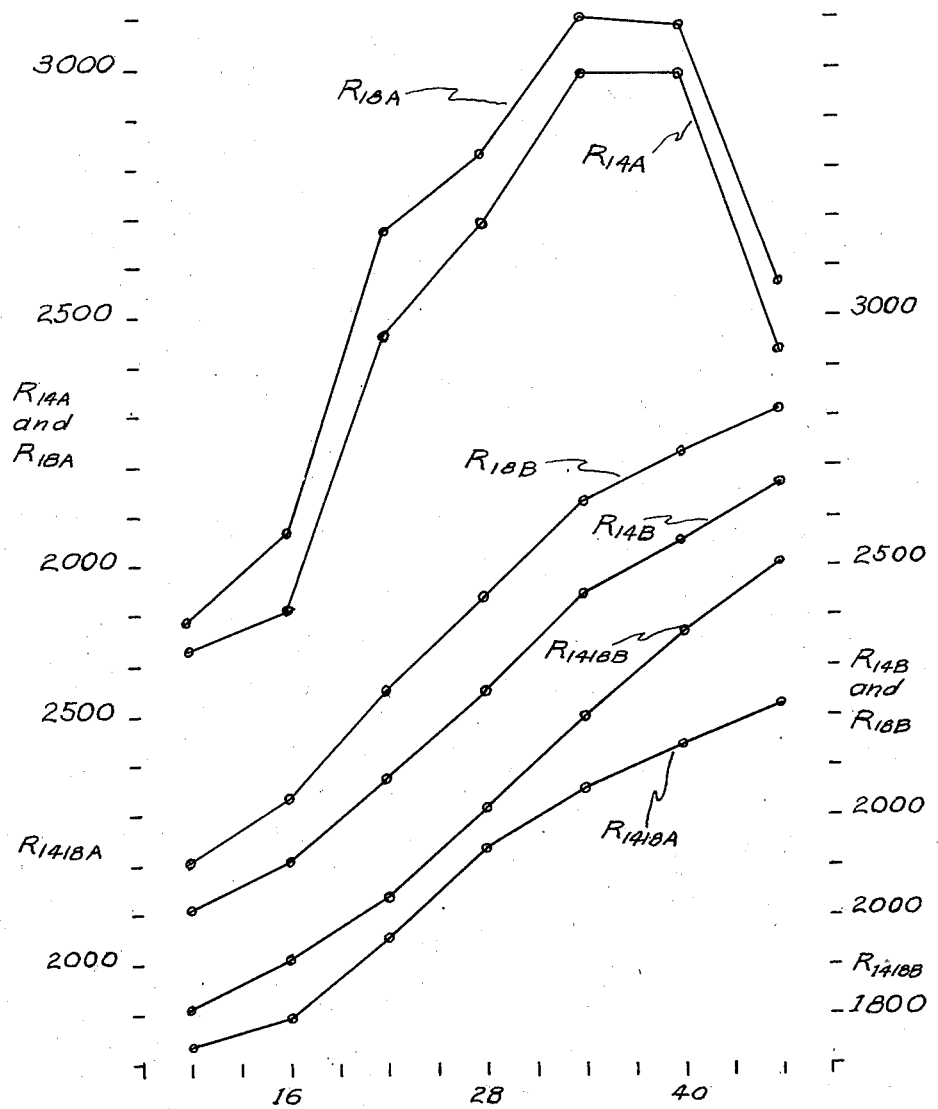

Figure 2 shows curve plotted from small scale data, illustrating the nature of the influence of inhomogeneities on potential electrodes in the usual method of measuring earth resistivities. The abscissa of this curve is the separaton between the closest spaced potential and current electrodes in centimeters. The ordinate of this curve is apparent electrical resistivity in ohms per centimeter cube.

Figure 3 shows curves plotted from small scale data which are illustrative of the nature of the influence of inhomogeneities on potential electrodes and the extent to which this influence is eliminated by the electrical prospecting method herein described. Curves $R_{14A}$, $R_{18A}$, and $R_{1418A}$ were obtained with an inhomogeneity present under the potential electrode traverse. Curves $R_{14B}$, $R_{18B}$, and $R_{1418B}$ were obtained with the inhomogeneity under potential traverse removed but with all other conditions unchanged. The abscissa of all curves is the distance in centimeters between the closest spaced potential and current electrodes and the ordinates of all curves are apparent resistivity in ohms per centimeter cube.

Figure 4:
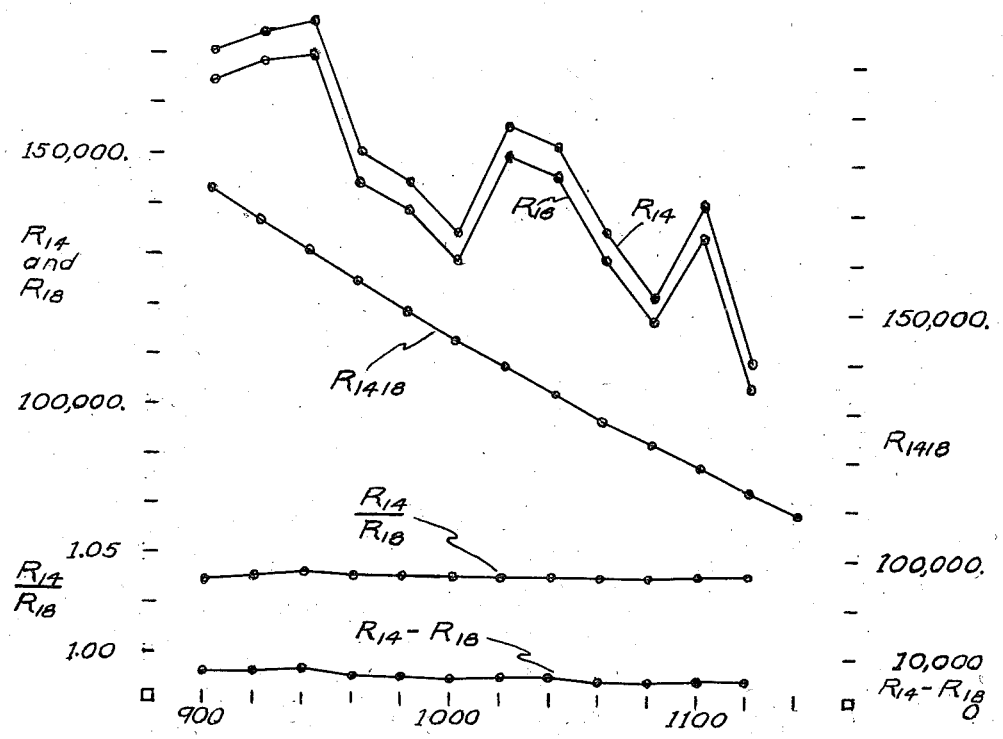

The curves of Figure 4 are from field data obtained by use of the electrical prospecting method herein described. Curves $R_{14}$ and $R_{18}$ are apparent resistivity curves similar to that usually obtained by earth resistivity measurements but which are related to each other in the manner characteristic of the above electrical prospecting method. Curve $$\frac{R_{14}}{R_{18}}$$

is an increment curve obtained from curves $R_{14}$ and $R_{18}$ and expressed as a ratio. Curve $R_{14}-R_{18}$ is a similar increment curve expressed as a difference. Curve $R_{1418}$ is a corrected apparent resistivity curve determined from curves $R_{14}-R_{18}$ or $$\frac{R_{14}}{R_{18}}$$

and an initial resistivity value in the manner hereinafter described. The abscissa of all curves of Figure 4 is the distance between the closest spaced potential and current electrodes in feet and the ordinate of all curves except $$\frac{R_{14}}{R_{18}}$$

is in ohms per centimeter cube. The ordinates of curve $$\frac{R_{14}}{R_{18}}$$

is the numerical value of the indicated ratio.

Figure 5:
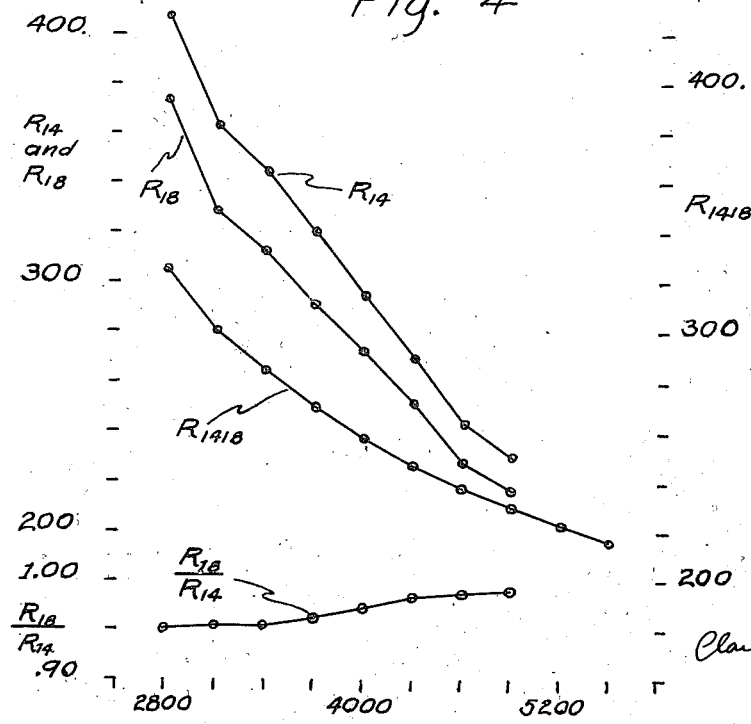

The curves of Figure 5 are similar to those designated by the same symbols in Figure 4. The curves of Figure 5 are from field data taken with relatively great spacing between potential and current electrodes in an area of low resistive sedimentary formations.

The spacing between various electrodes is not critical and may be varied within rather wide limits dependent upon conditions and equipment. For prospecting in low resistive sedimentary formations it is usually sufficient to make the distance from 23 to 18 equal to the maximum depth to which prospecting is desired and the distance from 18 to 14 equal to the distance from 13 to 1 and about one eighth of the maximum depth.

Electrodes 23, 18, and, 14 remain fixed. The distance between 13 and 1 is preferably maintained constant while the distance between 13 and 1 and 14 and 18 is varied. Electric current, preferably direct for deep prospecting, is first passed from battery 21 (or other source of steady electric current) through variable resistance 20 ammeter 19 switch 16 conductor 15 into the earth, through the earth by various paths to electrode 23, and through conductor 22 to the opposite terminal of battery 21. The potential difference between electrodes 13 and 1 due to this current flow through the earth is measured by means of potentiometer 3 and galvanometer 6 the potentiometer having first been standardized in the usual manner by use of standard cell 5. It is also necessary to compensate for potential differences existing between 13 and 1 when no current is flowing from battery 21. This is accomplished by means of potentiometer 11 which is adjusted while switch 16 and switch 4 are open, switches 9 and 2 being closed, until the deflection of galvanometer 6 is approximately zero. As indicated by the figure, the opening of switch 4 opens the working current circuit of potentiometer 3. With electrodes 13 and 1 in the same position as for current flow between electrodes 14 and 23 switch 16 is thrown so as to connect to electrode 18 through conductor 17 resulting in electric current flow through the earth from electrode 18 to electrode 23. The potential difference between electrodes 13 and 1 due to this current flow is measured in the same manner as for current flow between electrodes 14 and 23. Leaving the position of electrodes 14, 18, and, 23 fixed electrodes 13 and 1 are moved thereby varying the distance between 13 and 1 and 18 and 14. The distance between electrodes 13 and 1 is preferably maintained constant but may be varied if desired. It is also preferable to maintain the current flow to electrodes 14 and 18 equal for a given series of potential difference measurements for a given position of 14 and 18. This is conveniently accomplished by regulating variable resistance 20. Separate potential difference measurements with current flow between 14 and 23 and 18 and 23 are made for each position 13 and 1.

The measurement of the distances between electrodes, the measurement of current by ammeter 19 and the measurement of potential difference between 13 and 1 is sufficient data for the calculation of the electrical resistivity of a certain portion of earth by means of well known mathematical formulae.

The formula for calculating apparent resistivity for the electrode arrangement shown in Figure 1 for current flow between electrodes 14 and 23 is:

$$R_{14} = \frac{2\pi E_{14}}{I\left(\frac{1}{C} - \frac{1}{D+C} + \frac{1}{D+C+B+A} - \frac{1}{C+B+A}\right)}$$

and for current flow between electrodes 18 and 23 is:

$$R_{18} = \frac{2\pi E_{18}}{I\left(\frac{1}{C+B} - \frac{1}{C+B+D} + \frac{1}{D+C+B+A} - \frac{1}{C+B+A}\right)}$$

In these formulas A is the distance between electrodes 23 and 18, B the distance between electrodes 18 and 14, C the distance between electrodes 14 and 13, and D the distance between electrodes 13 and 1. $E_{14}$ and $E_{18}$ is the electric potential difference between electrodes 13 and 1 caused by the flow of electric current I between electrodes 14 and 23 and 18 and 23 respectively. If current is in amperes, potential difference in volts, and distances in centimeters $R_{14}$ and $R_{18}$ will be expressed as ohms per centimeter cube. The derivation of the above formula is well known to the art. (The development of apparent resistivity formulas for various electrode arrangements is discussed in detail in Technical Publication #418 of the American Institute of Mining and Metallurgical Engineers, by J. N. Hummel.) For non-homogeneous earth this resistivity value is principally dependent upon the size, shape, resistivity, and position with respect to the electrode system, of the various bodies stratum or earth portions present and is hereinafter referred to as apparent resistivity. Bodies earth stratum, or earth portions, having electrical resistivities differing from that of adjacent or surrounding earth will hereinafter be referred to as resistive inhomogeneities.

If the position of current electrodes 14 and 23 (or 18 and 23) remain fixed while potential difference measurements are made for positions of potential electrodes 13 and 1 at various distance from and along an extension of the line through electrodes 14 and 18 the curve obtained by plotting distance between closest spaced current and potential electrodes as the abscissa and calculated apparent resistivity values as the ordinate, will be influenced by resistivity variations within the earth of two classes. The first is the variation of apparent resistivity due to the lack of resistive homogeneity of the earth perpendicular to stratification because of the usual occurrence of approximately horizontal strata of different resistivities below the current electrodes, particularly 14 and 18 if 23 is remote. The second source of variations of apparent resistivity is due principally to the usual lack of resistive homogeneity of the surface layer or soil. The nature of apparent resistivity variations from these two sources and their relation is indicated by the following well known mathematical expression:

$$V = \frac{RI}{2\pi}\left(\frac{1}{D} + F\right)$$

In this expression V is the electric potential above zero at a distance D from the electrode by which current I is introduced into the earth if the other required current electrode is at an infinite distance. R is the resistivity of the surface layer which is assumed to be horizontal, homogeneous, and of infinite lateral extent F is a mathematical function which represents the influence on V of the various horizontal and infinitely extending layers of various resistivities which are present below the surface layer. (Derivation of this expression may be found in Technical Publication #400 of the American Institute of Mining and Metallurgical Engineers, by Ehrenburg and Watson). Earth strata, however, usually contain various resistive inhomogeneities both perpendicular and parallel to stratification. The variation of resistivity parallel to stratification is usually much greater near the surface because of greater variation of the extent to which formations are saturated with water and electrolytic solutions and because of weathering.

In the application of electrical resistivity measurements to the location of oil or gas saturated formations, determination of depth to a given stratum, or the location of relatively deep ore bodies, particularly those lying approximately horizontal, it is only the portion of the apparent resistivity curve which is due to the formations lying below the current electrodes such as 14 and 18 which is of interest. If 14, 18, and 23 are left stationary and potential difference measurements are taken for various positions of 13 and 1, resistive inhomogeneities near the surface and in the vicinity of 13 and 1 usually result in apparent values considerably different from that which would have been obtained if the surface layer had been uniform as to resistivity, or homogeneous. The influence of such inhomogeneities quite frequently cause sharp maxima and minima on apparent resistivity curves which have lead to many erroneous attempts to correlate such maxima and minima with vertical resistivity changes below the current electrodes.

For each position of 13 and 1 a separate calculation of apparent resistivity is made for current flow between 14 and 23 and 18 and 23. Experiment and experience under various geological conditions indicate that in most cases the difference of the two resistivities is approximately independent of resistive inhomogeneities in the vicinity of electrodes 13 and 1. If the earth in the proximity of electrodes 14 and 18 has approximately uniform resistivity and 23 is remote in comparison to separation of 13 and 1 and 18 this difference in resistivity approximates the increment of apparent resistivity which would be obtained if the resistivity of the surface layer were uniform and the electrodes 13 and 1 both moved the distance between 14 and 18. The term increment is intended herein to signify either increase or decrease. To facilitate interpretation of data the distance between 14 and 18 may be made equal to the distance between 13 and 1 and 13 and 1 moved by this distance for each successive pair of potential difference measurements. In this manner a series of apparent resistivity increments are obtained which represent the increment in apparent resistivity for an increment of electrode separation equal to the distance between 14 and 18 for various distances of separation between electrodes 14 and 18 and 13 and 1. If the apparent resistivity for some one position of 13 and 1 is used for an initial value the variation of apparent resistivity with variation of separation between 13 and 1 and 14 and 18 may be approximately determined. The apparent resistivity determined by use of increments and an initial resistivity value in the above manner is herein referred to as a corrected apparent resistivity curve to avoid confusion with the usual apparent resistivity curve such as $R_{14}$ of Figure 4. The curve obtained by plotting apparent resistivity values as the ordinate and distances between electrodes 13 and 14 or 18 as the abscissa (or vice-verse) in a system of rectangular cartesian coordinates is herein referred to as an apparent resistivity curve. Data secured under various geological conditions indicates that the above described corrected apparent resistivity curve is in most cases approximately independent of the variation in resistive inhomogeneities in the vicinity of electrodes 13 and 1 between the various positions of these electrodes.

If 23 is at a sufficiently great distance from 13 and 1 the form of the apparent resistivity curve obtained in the above manner will principally be dependent upon the position of resistive inhomogeneities of a given resistivity, dimensions etc. with respect to electrodes 14 and 18. By repeating the above described procedure for various positions of the electrode system in the area to be prospected a series of corrected apparent resistivity curves may be determined. By the application of the various known procedures for the analysis and interpretation of apparent resistivity curves or corresponding increment curves, the character, dimensions, position etc. of the various resistive inhomogeneities may be inferred. (For information regarding interpretation of apparent resistivity curves reference is made to "Geophysical Prospecting 1929" "Geophysical Prospecting 1932," and "Geophysical Prospecting 1934" published by the American Institute of Mining and Metallurgical Engineers as well as other publications of this organization. Also publications of the United States Bureau of Mines and the American Association of Petroleum Geologists.)

It is sometimes preferable to employ three (or more) electrodes such as 14 and 18 thereby obtaining data for the determination of two (or more) corrected apparent resistivity curves for a given series of positions of 13 and 1.

The reason that the apparent resistivity increment obtained by the above method has a high degree of independence of resistive inhomogeneities in the vicinity of potential electrodes is suggested by reference to Figure 2. Figure 2 is an apparent resistivity curve obtained by small scale experiment. In this case the electrode system was suspended by a framework over a water pond, the current and potential electrodes being in electrical contact with the water and slightly below its surface. A small nonconducting sheet was placed below one potential electrode such as 13 and very close to it. The distance between current and potential electrodes was varied by moving the current electrode corresponding to 14, the position of all other electrodes remaining fixed. Only two current electrodes were used, those corresponding to 14 and 23. After obtaining sufficient data for calculation of apparent resistivity for various electrode spacings the nonconducting sheet under potential electrode 13 was removed and similar data again taken thus providing a means of correcting for resistive inhomogeneities other than the non-conducting sheet. In Figure 2 the net change in apparent resistivity caused by inserting the nonconducting sheet is plotted as the ordinate and the distance between current and potential electrodes such as between 14 and 13 as the abscissa. It is evident from Figure 2 that the influence of the above resistive inhomogeneity under potential electrode 13 approaches a straight line and becomes approximately parallel to the abscissa, if the electrode spacing is sufficiently great. For the portion of the curve of Figure 2 which is approximately parallel to the abscissa a given increase in spacing between current and potential electrodes results in a very small or negligible change in the resistive influence of the inhomogeneity. Therefore for electrode spacings great in proportion to the distance from 13 or 1, or both, to the inhomogeneity the difference between apparent resistivity values for two different spacings between current and potential electrodes will approximately eliminate the resistive influence of the inhomogeneity, but will not alter the resulting increment in resistivity due to relatively deep horizontal layers, or bodies. Inhomogeneities sufficiently large to extend under both potential electrodes are of the same nature as a change in resistivity of the surface layer and should be more accurately eliminated by taking a ratio between the apparent resistivity values corresponding to the two different electrode spacings rather than their difference as suggested above. However, the results of numerous tests in the field with the method of prospecting herein described indicates that the type of inhomogeneity ordinarily encountered in deep prospecting in sedimentary formations is eliminated with a high degree of accuracy by using either the difference or ratio between the two apparent resistivity values as the corrected resistivity increment. The above field tests were taken under a great variety of geological conditions and with spacing between current and potential electrodes ranging from a few hundred feet to eight thousand feet.

Resistive inhomogeneities in the vicinity of current electrode 14 which are not present at electrode 18 (or vice-versa) will also influence the apparent resistivity increment as measured by the above method. It is well known to the art that resistive inhomogeneities in the vicinity of current electrodes are of negligible influence on apparent resistivity values for proportionately large spacings between current and potential electrodes. It follows from the curve of Figure 2 by the well known law of reciprocity that a similar resistive inhomogeneity under current electrode 14 will produce a similar curve. It is evident that the resulting increment curve will be different from that which would have been obtained if no inhomogeneity were present in the vicinity of electrode 14 or 18. However, for spacings between current and potential electrodes great in proportion to the distance from the current electrode to the inhomogeneity the resulting change in the increment curve is obviously that of increasing or decreasing its ordinates by approximately equal amounts. This results in no material change in the form of the increment curve or the corresponding corrected resistivity curve and consequently does not obscure the resistive influence on the form of either curve resulting from oil or gas sands, ore bodies, or strata located at relatively great depths in proportion to the distance from the current electrode to the above inhomogeneity. Experience indicates that the influence on current electrode of inhomogeneities ordinarily encountered in sedimentary formations is usually of negligible magnitude for spacings between current and potential electrodes greater than 2000'.

The curves of Figure 3 were obtained from actual small scale experimental data with the electrical prospecting method herein described and illustrates the degree to which the influence of an inhomogeneity of considerable magnitude in the vicinity of electrodes 13 and 1 is eliminated. In this case the electrode system was suspended by a framework over a water pond at such a height as to be in electrical contact with the water near its surface. Two complete sets of data were taken which were exact duplicates except that the inhomogeneity underneath electrodes 13 and 1 was removed for one set of curves. The inhomogeneity was a square sheet of insulating material placed below electrodes 13 and 1 and very close to them. Apparent resistivity curves $R_{14A}$ and $R_{18A}$ were obtained with the inhomogeneity in place and curves $R_{14B}$ and $R_{18B}$ are similar resistivity curves with the inhomogeneity removed. Curve $R_{1418A}$ is the corrected apparent resistivity curve obtained from $R_{14A}$ and $R_{18A}$. Curve $R_{1418B}$ is the corrected apparent resistivity curve obtained from $R_{14B}$ and $R_{18B}$. It will be noted that although curve $R_{1418A}$ is not identical with curve $R_{1418B}$ it is apparent that the influence of the inhomogeneity is greatly reduced. Reference to the curves of Figures 4 and 5 indicate that the influence of inhomogeneities encountered in practice ordinarily are eliminated to a greater degree than that of Figure 3. Cases are frequently encountered in the field, however, in which the influence of inhomogeneities on electrodes 13 and 1 are not eliminated with a sufficient degree of accuracy. Inhomogeneities near potential electrodes usually produce sharp changes in apparent resistivity curves $R_{14}$ and $R_{18}$ which occur at a given position of electrodes 13 and 1 rather than at a given spacing between current and potential electrodes, whereas the influence of deep resistivity changes produce much smoother curves. It is consequently usually possible to estimate the extent to which inhomogeneities are present in any given case. If curves of any given position of electrodes 14 and 18 appear doubtful for this reason another set of curves for approximately the same location of these electrodes may be obtained by rotating the electrode system about the mid-point of the line segment joining 14 and 18. In this way the potential electrodes may be moved across different ground for a given approximate location of 14 and 18. This process may be repeated until data which is sufficiently free of influence of inhomogeneities is obtained.

Curves $R_{14}$ and $R_{18}$ of Figure 4 are apparent resistivity curves calculated from actual field data obtained with the electrode arrangement herein described. These curves clearly indicate the nature of the various maxima and minima which ordinarily occur on apparent resistivity curves. In this case all potential and current electrodes were approximately along the same straight line. Distance between 13 and 1 was 20', between 14 and 18, 20', and between 18 and 23 3300'. Electrodes 13 and 1 were placed between electrodes 14 and 23 in this case instead of the position shown in Figure 1. The abscissa of the curves of Figure 4 is the distance between electrodes 13 and 14 in feet and the ordinates of curve $R_{14}$, $R_{18}$, $R_{1418}$, and $R_{14}-R_{18}$ the apparent resistivity in ohms per centimeter cube. The ordinates of curve $$\frac{R_{14}}{R_{18}}$$

is the numerical value of the indicated ratio. Curve $R_{14}$ is the apparent resistivity curve obtained for current flow between electrodes 14 and 23, and $R_{18}$ is a similar curve for current flow between electrodes 18 and 23. It will be noted from Figure 4 that the various maxima and minima occurring on curves $R_{14}$ and $R_{18}$ are associated with a given position of electrodes 13 and 1 rather than the distance from 13 to 14 or 18. It is consequently evident that such features are principally due to resistive inhomogeneities in the vicinity of 13 and 1. Curves R14—R18 and $$\frac{R_{14}}{R_{18}}$$

of Figure 4 are increment curves obtained from apparent resistivity curves R14 and R18. The ordinates of curve R14—R18 is the value obtained by subtracting apparent resistivity values for current flow between electrodes 18 and 23 from that obtained for current flow between electrodes 14 and 23 for a given position of potential electrodes 13 and 1. Curve $$\frac{R_{14}}{R_{18}}$$

is similar to curve R14—R18 except that the increment is expressed as a ratio by dividing the apparent resistivity value with current flow between electrode 14 and 23 by that obtained from current flow between electrodes 18 and 23 for a given position of electrodes 13 and 1. Curve R1418 is the corrected apparent resistivity curve calculated by use of increment curve $$\frac{R_{14}}{R_{18}}$$

(or increment curve R14—R18) and the resistivity value for greatest spacing between current and potential electrodes, this value being preferable because the influence of inhomogeneities decreases as spacing between current and potential electrodes is increased. Since for each position of electrodes 13 and 1 the distance from potential electrode 13 to current electrode 18 is 20' greater than that between electrodes 13 and 14 the resistivity increment for each position of electrodes 13 and 1 represents the change in apparent resistivity for a 20' change in electrode spacing, if the influence of inhomogeneities which are present to a greater extent at electrode 14 than at electrode 18 (or vice-versa) is neglected. For each position of 13 and 1 the resistivity is less for the greater spacing between current and potential electrodes. Therefore the corrected apparent resistivity curve will decrease with an increase in spacing between current and potential electrodes. In this case the apparent resistivity for current flow between electrodes 18 and 23 for the position of electrodes 13 and 1 for which the distance between electrode 13 and 14 was 1120' was chosen as an initial value for the corrected apparent resistivity curve. The apparent resistivity value of R18 for this position of 13 and 1 was 109,000 ohms per centimeter cube. This is chosen as the value of corrected apparent resistivity for a spacing between current and potential electrodes of 1140', this being the distance from electrode 13 to electrode 18. The ratio between R14 and R18 is 1.0447 for the position of 13 and 1 for which the distance from electrode 13 to electrode 14 was 1120' and the distance from electrode 13 to electrode 18, 1140'. This ratio consequently is the ratio between the corrected resistivity value for an electrode spacing of 1120' and 1140' respectively. The corrected resistivity value for a spacing of 1120' is 109,000×1.0447 or approximately 113,600 ohms per centimeter cube. In like manner the corrected resistivity value for an electrode spacing of 1100' is obtained by multiplying 113,600 by the apparent resistivity increment expressed as a ratio for the position of electrodes 13 and 1 for which the distance from 13 to 14 is 1100'. Additional corrected apparent resistivity values are obtained by a continuation of this procedure. The corrected apparent resistivity curve may also be determined by use of an initial value and the increment curve expressed as a difference. In this case the difference corresponding to each variation of electrode spacing would be added or subtracted as the case might be, for the preceding corrected apparent resistivity value.

The curves of Figure 5 are calculated from actual field data in an area of low resistive sedimentary formations. In this case the electrode arrangement was that indicated by Figure 1. Electrodes 18 and 23 were 4000' apart, 13 and 1 600' apart, and 14 and 18 600' apart. The distance between 13 and 14 was varied by 300' increments from 2800' to 4900'. If the apparent resistivity value of curve R18 having an abscissa of 4900' is chosen as the initial resistivity value of the corrected resistivity curve for an electrode separation of 5500', corrected resistivity values may be calculated by use of this value and increment curve, for abscissa values of 4900', 4300', 3700', etc. If the initial resistivity value is chosen for 5200' corrected apparent resistivity values can similarly be determined for 4600', 4000', 3400', etc. Two separate corrected apparent resistivity curves are therefore determined from this data, the points determined for each being intermediate with respect to the other. If the corrected resistivity curve is first determined for one set of points the two curves may be correctly combined by choosing the proper initial resistivity value for the other set of points. It is usually sufficient to determine the proper initial value for the intermediate points by a method of trial and error, the selected value being such as will result in a smooth curve. For the precise determination of the corrected curve at smaller intervals for a given spacing of 13 and 1 the distance between 14 and 18 may be made equal to the desired interval but it is sometimes desirable in practice to obtain additional detail on a curve first taken with a larger spacing between 14 and 18.

The variation (or increment) of apparent resistivity for a given position of 13 and 1 obtained by first passing current to 14 and 23 then to 18 and 23 (or vice-versa) may be expressed mathematically in a number of ways other than described and apparent resistivity curves or other quantities determined therefrom from which the character, position, etc. of resistive inhomogeneities may be inferred. It is consequently not my intent to limit the use of this invention to the particular scheme of analysis of results or interpretation herein described.

As used herein the terms "distribution of electric current" is intended to signify change in direction of current flow at any, or all, points in the earth with reference to a given point. For example if one position of electrode 13 is chosen as a reference point a different distribution of electric current within the earth is said to occur, if, with steady state direct current flowing through the earth between electrodes 18 and 23, switch 16 is thrown so as to cause a current flow between electrodes 14 and 23.

Switch 25 is provided for shortcircuiting galvanometer 6 during the opening or closing of switches 16 and 4. This prevents deflection of the galvanometer because of failure to manipulate switches 16 and 4 simultaneously. It would also be possible to open the circuit through galvanometer 6 during the above switching operations but a short-circuiting or shunting arrangement is preferable because there is less tendency for the galvanometer system to oscillate. It is usually necessary to make several successive observations of the galvanometer with the potentiometer working current and current flow through the earth alternately on and off before an accurate setting of potentiometer 3 can be determined.

Various changes and alternative arrangements may be made within the scope of the appended claims in which it is my intention to claim all novelty in the invention as broadly as the prior art permits.

I claim:

1. The method of electrical prospecting which comprises causing, at different times, a flow of electric current through the earth between each of two spaced apart electrodes at the approximate location at which prospecting is desired and an area remote therefrom, and the separate measurement, between two other spaced apart grounded electrodes for each of a desired number of positions, of the potential difference caused to exist therebetween by each of the said flows of electric current through the earth.

2. The method of electrical prospecting which comprises causing, at different times, a flow of electric current through the earth between each of two spaced apart electrodes at the approximate location at which prospecting is desired and an area remote therefrom, and the separate measurement, between two other spaced apart grounded electrodes for each of a desired number of positions, of the potential difference caused to exist therebetween by each of the said flows of electric current through the earth, and the determination of the magnitude of one of said flows of electric current through the earth relative to the magnitude of the other of said flows of electric current through the earth.

3. The method of electrical prospecting which comprises causing at different times, a flow of electric current through the earth between each of two spaced apart electrodes at the approximate location at which prospecting is desired and an area remote therefrom, and the separate measurement, between two other spaced apart grounded electrodes for each of a desired number of positions, of the potential difference caused to exist therebetween by each of the said flows of electric current through the earth, and the maintaining of a given relation between the magnitude of one of the said flows of electric current through the earth and the other of the said flows of electric current through the earth.

4. In a method of electrical prospecting in which an electric current is caused to flow through the earth, at different times, between two spaced apart electrodes at the approximate location at which prospecting is desired and an area remote therefrom, and in which measurement is made of the potential difference caused to exist between spaced apart grounded potential electrodes by each of these flows of electric current, at each of a desired number of positions of said potential electrodes, the improvement which comprises comparing, for each position of said potential electrodes, the potential difference caused to exist therebetween by one of the said flows of electric current through the earth, with the potential difference which is caused to exist therebetween by the other of the said flows of electric current through the earth.

5. In a method of electrical prospecting in which an electric current is caused to flow through the earth, at different times, between two spaced apart electrodes at the approximate location at which prospecting is desired and an area remote therefrom, and in which measurement is made of the potential difference caused to exist between spaced apart grounded potential electrodes by each of these flows of electric current, at each of a desired number of positions of said potential electrodes, the improvement which comprises, comparing for each position of said potential electrodes, the ratio between the magnitude of one of the said flows of electric current through the earth and the potential difference which it causes to exist between said potential electrodes with the ratio between the magnitude of the other of the said flows of electric current through the earth and the potential difference which it causes to exist between the said potential electrodes.

6. The method of electrical prospecting which comprises placing an electrode in electrical contact with the earth in an area remote from the approximate location to be prospected, the placing of two spaced apart electrodes in electrical contact with the earth at the approximate location to be prospected, the placing of two spaced apart electrodes suitable for potential difference measurement in electrical contact with the earth at any desired number of positions, at various distances from said two electrodes at the approximate location to be prospected, the electrical connection of one terminal of a source of electric current to said remote electrode, the separate electrical connection of the other terminal of said source of electric current to each of the said electrodes at the approximate location to be prospected in such a manner as to cause, for any given connection, a flow of electric current through the earth between said remote electrode and one of the said electrodes at the approximate location to be prospected, the separate measurement, for each position of said electrodes suitable for potential difference measure, of the potential difference caused to exist therebetween because of each of said separate flows of electric current through the earth.

7. The method of electrical prospecting which comprises placing an electrode in electrical contact with the earth in an area remote from the approximate location to be prospected, to a placing of two spaced apart electrodes in electrical contact with the earth at the approximate location to be prospected, the placing of two spaced apart electrodes suitable for potential difference measurement in electrical contact with the earth at any desired number of positions, at various distances from said two electrodes at the approximate location to be prospected, the electrical connection of one terminal of a source of electric current to said remote electrode, the separate electrical connection of the other terminal of said source of electric current to each of the electrodes at the approximate location to be prospected in such a manner as to cause, for any given connection, a flow of electric current through the earth between said remote electrode and one of the electrodes at the approximate location to be prospected, the separate measurement, for each position of said electrodes suitable for potential difference measurement of the potential difference caused to exist therebetween because of each of said separate flows of electric current through the earth and in which a known relation exists between the magnitude of said flow of electric current to the earth from one of the said electrodes at the approximate location to be prospected and the magnitude of said flow of electric current to the earth from the other said electrode at the approximate location to be prospected.

8. A method of electrical prospecting according to claim 7 in which said potential difference obtained for a given position of said electrodes suitable for potential difference measurement with electric current flowing to the earth from one of said electrodes at the approximate location to be prospected, is compared with said potential difference measurement between said electrodes suitable for potential difference measurement with electric current flowing to the earth from the other said electrode at the approximate location to be prospected.

9. A method of electrical prospecting according to claim 7 in which data obtained for a given position of said electrodes suitable for potential difference measurement, with current flowing to the earth from one of the said electrodes at the approximate location to be prospected is compared with data obtained for the same position of said electrodes suitable for potential difference measurement with electric current flowing to the earth from the other said electrode at the approximate location to be prospected, and in which quantities obtained by said comparison of data are compared with similar quantities obtained for other positions of electrodes suitable for potential difference measurements at various distances from said two electrodes at the approximate location to be prospected, substantially as described.

CLARENCE C. BEACHAM.